United States Patent [19]

Workman

[11] Patent Number: 5,545,324

[45] Date of Patent: Aug. 13, 1996

[54] SKIMMER MECHANISM FOR RECTANGULAR BASIN CHAIN AND FLIGHT

[75] Inventor: Steven G. Workman, Holladay, Utah

[73] Assignee: Baker Hughes Incorporated, Houston, Tex.

[21] Appl. No.: 268,308

[22] Filed: Jun. 29, 1994

[51] Int. Cl.⁶ ................................. B01D 21/18
[52] U.S. Cl. ................. 210/525; 210/526; 178/732
[58] Field of Search .................... 198/728, 732, 198/727; 210/221.1, 221.2, 523, 525, 526, 540

[56] References Cited

U.S. PATENT DOCUMENTS

| | | | |
|---|---|---|---|
| 1,999,863 | 4/1935 | Briggs | 210/525 |
| 2,067,277 | 1/1937 | Miick | 210/526 |
| 2,160,535 | 5/1939 | Briggs | 198/732 |
| 2,237,172 | 4/1941 | Briggs | 210/525 |
| 2,633,989 | 4/1953 | Kelly et al. | 210/525 |
| 3,140,774 | 7/1964 | Johnston et al. | 210/526 |
| 3,204,773 | 9/1965 | Lind | 210/525 |
| 4,268,394 | 5/1981 | Wolfe | 210/525 |
| 4,867,872 | 9/1989 | Russell et al. | 210/540 |
| 5,057,219 | 10/1991 | Fujiwara | 210/525 |
| 5,158,679 | 10/1992 | Brock | 210/525 |
| 5,250,178 | 10/1993 | Casper et al. | 210/526 |
| 5,336,417 | 8/1994 | Hannum | 210/526 |

FOREIGN PATENT DOCUMENTS

| | | |
|---|---|---|
| 5376467 | 7/1978 | Japan . |
| 5843126 | 9/1983 | Japan . |
| 5854844 | 12/1983 | Japan . |

OTHER PUBLICATIONS

Fujiwara Industry Co., Ltd brochure entitled "Improved Water Quality Fuji Float Automatic Scum Removal", undated.

*Primary Examiner*—Christopher Upton
*Attorney, Agent, or Firm*—Trask, Britt & Rossa

[57] ABSTRACT

A chain and flight mechanism for use in a clarifier tank or other fluid treatment tank includes a skimmer mechanism having a three dimensional configuration and an interior space for collecting floating debris and scum which floats on the water in the tank. The skimmer mechanism is attached to the flight of the chain and flight mechanism by hinge means which allows the skimmer mechanism to move relative to the flight. The fluid treatment tank further includes a self-adjustable scum trough which is capable of moving up and down in the tank responsive to varying water levels.

15 Claims, 9 Drawing Sheets

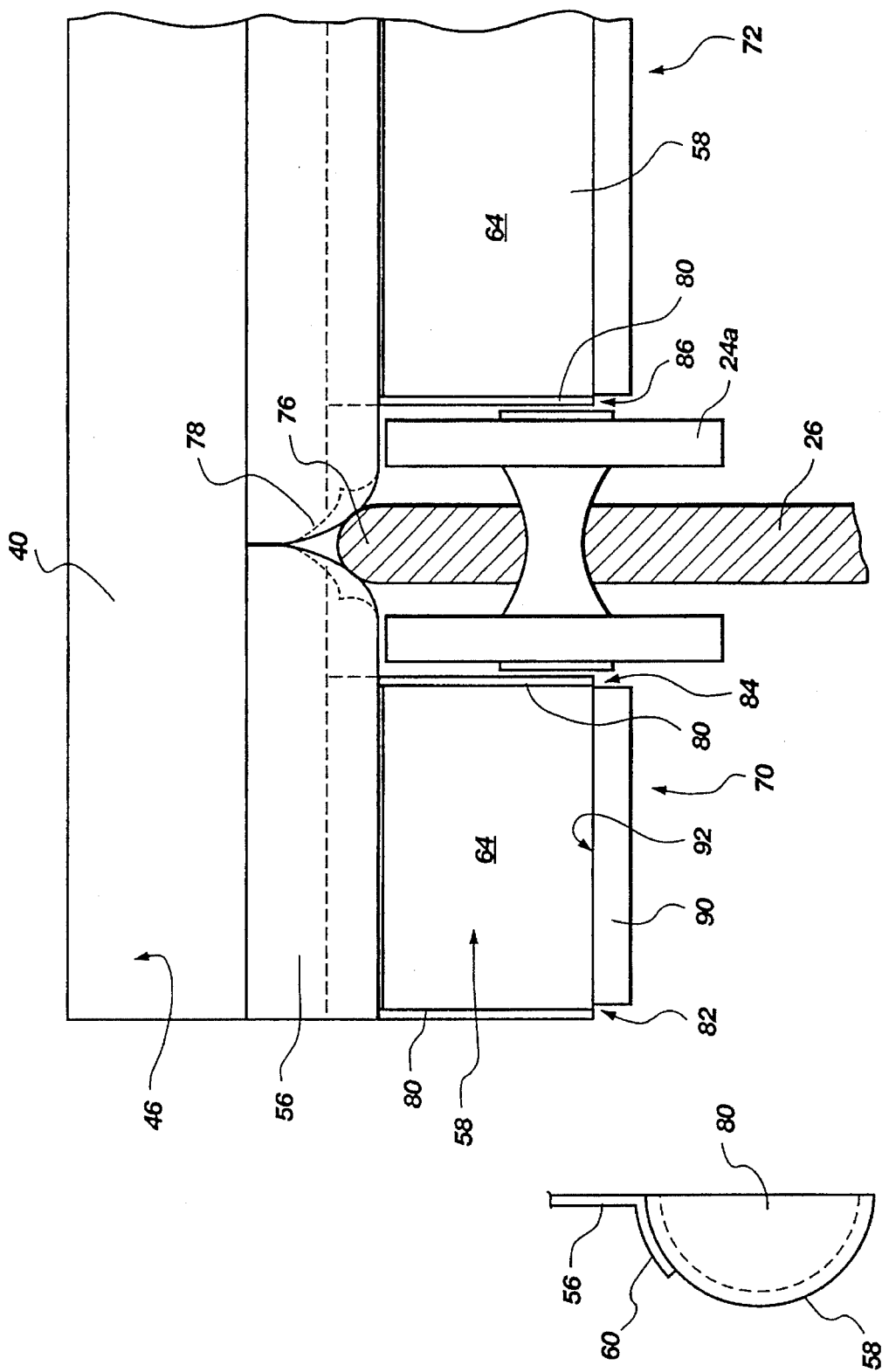

SKIMMER MECHANISM FOR RECTANGULAR BASIN CHAIN AND FLIGHT

BACKGROUND

1. Field of the Invention

The present invention relates to skimmer mechanisms installed in clarifier tanks to remove scum and debris floating on top of the water in the tank. More specifically, this invention relates to skimmer mechanisms configured for use in rectangular basins or clarifier tanks having chain and flight mechanisms.

2. State of the Art

Clarifier tanks are used in waste water systems and other effluent systems for processing effluent to remove solids and particulate matter from the fluid. Fluid entering into the tank is treated to facilitate aggregation and precipitation of particulate matter which sinks to the bottom of the tank. Floatable matter rises to the top of the water and must be skimmed off or otherwise removed. It is vital to remove the scum or floating debris from the water to reduce or prevent unpleasant odors. Clarification systems may include as basic features a tank for receiving the effluent, a skimmer mechanism on the bottom of the tank to sweep scum off the tank bottom, a skimmer arm on the top of the water to skim floating debris therefrom and outlet means for removing clarified water from the tank.

Round clarifier tanks typically employ skimmer arms which are rotatably secured to a center pier or pipe, which are positioned at the water level in the tank and which sweep out a radius about the tank. The skimmer arms generally include an arm and a blade or planar flap extending down from the arm. As the skimmer arm sweeps the radius of the tank, the blade or flap skims along the surface of the water and moves floating debris along in the sweep. The collected floating debris is directed toward a scum trough positioned on or near the outer wall of the tank. The scum entering the trough is carried away from the tank through associated pipe systems.

In rectangular tanks, two means for removing scum and floatables from the water surface are typically used. The most commonly used means is a trough or pipe which is positioned to extend from wall to wall across the short width of the tank. The trough has an open top (or the pipe may have a slotted opening) which is positioned at or near the water level. Scum or debris floating on the water's surface moves with the motion of the water and eventually drifts toward the trough or pipe (when tilted) and spills into its open top. The collected scum is removed from the trough by outlet pipe means connected to the trough and directed externally to the tank.

The other common means of removing scum and floating debris in rectangular tanks includes a chain and flight mechanism mounted to the inner surface of the two long walls of the tank. That is, sprocket wheels are generally secured to the inside surface of the long walls at the four corners of each wall. A chain is wound about the four sprocket wheels on each wall. A flight is interconnected between the two aligned chains and spans the width of the tank. The chains are positioned in the tank so that the flight interconnected between them is positioned during its rotation at about the level of water in the tank. The flight comprises an upper portion which extends away from the chain and may also include a skimmer blade projecting downwardly from the upper portion.

The chains are caused to rotate simultaneously in a single direction. The flight moves with the chains and when at the top of the tank, sweeps along the water surface in the tank gathering scum and floating debris as it moves. A trough positioned across the width of the tank, between the two longitudinal walls, is positioned to receive the debris moved along by the flight. As the chains continue to rotate, the flight moves into the water until the flight rounds the nearest sprocket wheel in the bottom of the tank. The flight then moves along the bottom of the tank and may act to skim sunken scum along the tank bottom toward a scum trough located in the bottom of the tank. The flight continues to move from the bottom of the tank to the top of the tank as the chains rotate about the sprocket wheels.

Chain and flight mechanisms used in rectangular clarifier tanks may include more than one flight and may be caused to rotate slower or faster to increase or decrease the removal of scum, or to produce a drier or wetter scum, as desired.

The chain and flight mechanisms presently used in rectangular clarifier tanks are problematic in that they tend to become overloaded with scum as they move along the water surface, resulting in the scum sinking into the water under its own weight. Scum which sinks back into the water degrades the clarity of the effluent and results in an increase in undesirable odors emanating from the tank. The flight members are also not positioned to optimally catch all of the floating debris and may become useless if the water level in the tank drops. Chain and flight mechanisms also require human intervention to assure proper increase or decrease in rotation of the chain mechanism.

Therefore, it would be an improvement in the art to provide a chain and flight mechanism having a skimmer means which is capable of collecting sizable amounts of scum or floating debris without losing the debris from under the skimmer. It would be a further improvement in the art to provide a skimming mechanism which is adaptable to small fluctuating water levels within the tank.

SUMMARY OF THE INVENTION

In accordance with the present invention, a chain and flight mechanism is disclosed which includes a skimmer means hingedly attached to the flight and being configured to capture and retain scum therein until deposited within a scum trough positioned in a fluid tank in proximity to the fluid level therein. Also disclosed is an adjustable scum trough which allows removal of floating material from the water surface when the water level in the tank fluctuates. The chain and flight mechanism of the invention provides continuous collection and removal of floating material from the surface of the water in a clarifier tank with little or no human intervention. The present invention may be installed as part of a new tank system or may be configured for retrofitting to an existing rectangular fluid tank.

The chain and flight mechanism of the present invention includes a skimmer means which is connected to the flight of the mechanism by hinge means. The hinged attachment of the skimmer means to the flight allows the skimmer means to self-adjust relative to the water level in the tank and thereby adjust responsive to the amount of scum or floating debris. The self-adjusting capability of the skimmer facilitates the entrapment of debris in the skimmer mechanism for delivery to the collecting trough. The hinged attachment of the skimmer means also allows the skimmer means to rotate out of the pathway of the flight as it sweeps along the bottom of the tank.

The skimmer means may be attached to the bottom of the flight and be positioned between the chain. Alternatively, the skimmer means may be attached to the top of the flight and distanced away from the chain. The skimmer means attached to the bottom of the flight is a configuration of the mechanism used when the chain is installed to rotate throughout the tank. However, in some installations, the chain and sprocket wheels may be positioned at only one end of the tank and/or may be positioned above the water level in the tank so that the skimmer means only skims the water's surface to remove floating debris or scum. In the latter described installation, the skimmer means of the invention may be attached to the top of the flight.

When the skimmer means is attached to the bottom of the flight, the skimmer means may be configured to travel on either side of the two chains, and the hinge may be positioned at the level of the chains or slightly thereabove. In order to accommodate the travel of the chains over the sprockets, the hinge means may preferably be configured to yield, thereby allowing the hinge means and skimmer means to also travel over the sprockets. For example, slits may be formed in the hinge means in the area positioned over the chains so that the slit allows the hinge means to separate at that point as the chain travels over the sprocket.

The skimmer means of the present invention is preferably formed as an elongated member having a first edge which is attachable to the hinge means or flight, a second edge which is oriented away from the first edge and toward the water in the tank, and a non-planar wall positioned between the first and second edges. The skimmer means thus has a three-dimensional configuration in cross section perpendicular to the longitudinal axis of the elongated member and forms an interior space.

When the skimmer means is attached to the hinge means and the hinge means is connected to the bottom of the flight, the skimmer means may actually comprise three sections. A middle elongated section extends the distance formed between the two chains, and two short sections extend the distance from either chain to proximate the longitudinal tank wall near which the chain is located. Therefore, the skimmer means, though comprising three sections, extends essentially the width of the tank, interrupted only by the chains. When the skimmer means is attached to the top of the flight, the skimmer means may comprise a single elongated member.

In either embodiment of the skimmer means, the ends of the elongated members may be closed by the securement of end caps thereto. Thus, in the embodiment attached to the bottom of the flight, the two ends of each of the three sections which comprise the elongated member may be closed by means of end caps. In the embodiment attached to the top of the flight, the two ends of the elongated member may be closed by means of end caps. Closure of the ends of the elongated member, or its subsections, serves to retain floating debris within the interior space of the three-dimensional skimmer means. This configuration, in comparison to typical planar skimmer blades, enhances collection of floating debris and retains the debris within the interior space until it can be delivered to the scum trough for deposit.

The skimmer means may, in cross section, be substantially semi-circular or any other suitable shape which provides an interior space into which floating debris may be captured. Thus, the non-planar wall of the skimmer means positioned between the first and second edge of the skimmer means may be generally arcuate. Alternatively, the skimmer wall may comprise two or more wall segments, or may be corrugated.

The skimmer means may further include a resilient or flexible scraper lip positioned along the entire length of the second edge of the skimmer means. The resilient or flexible scraper lip acts as an additional scraper to assist in collecting and moving floating debris toward the scum trough.

The skimmer means is positioned to move along the surface of the water in the tank to collect and move floating debris or scum toward a scum trough. The scum trough is generally positioned at one end of the tank, and at or near the surface of the water. The scum trough generally comprises an elongated receptacle having an upper open end or slot into which the floating debris is deposited. The scum trough may be of any suitable size or configuration. Although the scum trough may typically be square in cross section, the scum through may be circular in cross section. The scum trough may even be substantially tubular, such as a pipe, with a slit formed along the length thereof. When a slotted pipe as described is used, the pipe may be rotated about a longitudinal axis formed through the pipe until the slot in the pipe is positioned more or less in the direction of the skimmer mechanism.

Conventional scum troughs located near the top of the tank for receiving floating debris are fixed in place by securement to the longitudinal walls of the tank. Therefore, if fluid in the tank decreases, the scum trough is positioned too far above the water level to receive any floating debris. In conventional chain and flight mechanisms, the flight is also positioned too far above the decreased water level to effect collection of floating debris. Thus, disclosed herein for use in connection with the inventive chain and flight mechanism is a self-adjusting scum trough. The self-adjusting scum trough is supported on either end by slidable means associated with the longitudinal walls of the tank, and the trough is thereby allowed to be buoyed up by the water. As a result, the self-adjusting scum trough will be properly positioned at the water level and will be operational despite a drop in fluid volume in the tank. Further, the skimmer means attached to the flight extends toward the water level a sufficient distance to enable continuous collection of floating debris and scum even though decrease in fluid level occurs.

The skimmer means may sweep floating debris directly to the scum trough. Alternatively, a beach may be attached to the trough. A beach is generally a planar landing attached at an angle to the upper edge of the trough facing toward the oncoming flight. As the skimmer means moves toward the beach, the second edge of the skimmer means, or the scraper lip if included, impacts against the beach and scrapes the floating debris up the planar surface of the beach. When the second edge of the skimmer means, or the scraper lip, reaches the top of the beach, the collected debris drops into the scum trough. A beach need not be attached to the scum trough. However, a beach has the advantage of keeping the debris or scum in the interior space of the skimmer means and keeps the debris from sinking into the tank.

The skimmer means of the present invention may be installed in a clarifier tank with a chain and flight mechanism which rotates about the upper portion and lower portion of the tank. In such an installation, the skimmer means, which is hingedly attached to the lower edge of the flight, rotates about the hinge means and remains out of the way of the flight or chain as the upper edge of the flight sweeps the bottom of the tank. As the flight rounds the sprocket wheels, bringing the flight to the upper portion of the tank, the skimmer means rotates about the hinge means again and is immediately in position at the water level to capture floating debris.

In an alternative operational configuration of the chain and flight mechanism, the sprocket wheels may be positioned in the tank so that the chain and flight rotate only at and above the water level in the tank. Such a configuration may be particularly suitable for retrofitting an existing tank which does not have sufficient dimension to accommodate a partially submerged chain and flight mechanism. In an "above-tank" installation, the skimmer means of the invention is attached to the upper edge of the flight and as the flight rotates proximate the water level, the skimmer means is positioned to sweep the water's surface. As the flight rotates away from the water level, the skimmer means rides atop the flight away from the chain.

The number of flights used in any particular chain and flight mechanism may vary from one to several, depending on the size of the tank and the degree of scum or debris which may need to be removed from the tank. In any installation, the number of skimmer means installed in the chain and flight mechanism may vary from a single skimmer attached to only one flight, to a skimmer means attached to only certain flights, to a skimmer means attached to every flight in the mechanism. Further, the chain and flight mechanism may be caused to rotate continuously at a selected (usually very slow) rate, or the chain and flight mechanism may be caused to rotate intermittently. The chain and flight mechanism may not need to be operated (i.e., caused to rotate) for days at a time. The degree and kind of skimming operation required in the clarifier tank may dictate how often the chain and flight mechanism is caused to operate, coupled with the number of skimmer means attached to the system. The chain and flight mechanism may be manifolded in adjacent clarifier tanks.

BRIEF DESCRIPTION OF THE DRAWINGS

In the drawings, which currently illustrate what is considered to be the best mode of the invention

FIG. 8 is a partial enlarged front view of the chain and flight with skimmer means positioned over a sprocket wheel;

FIG. 9 is a view in lateral cross section of the skimmer means illustrating an end cap positioned thereon;

DETAILED DESCRIPTION OF THE ILLUSTRATED EMBODIMENTS

Figure 1:
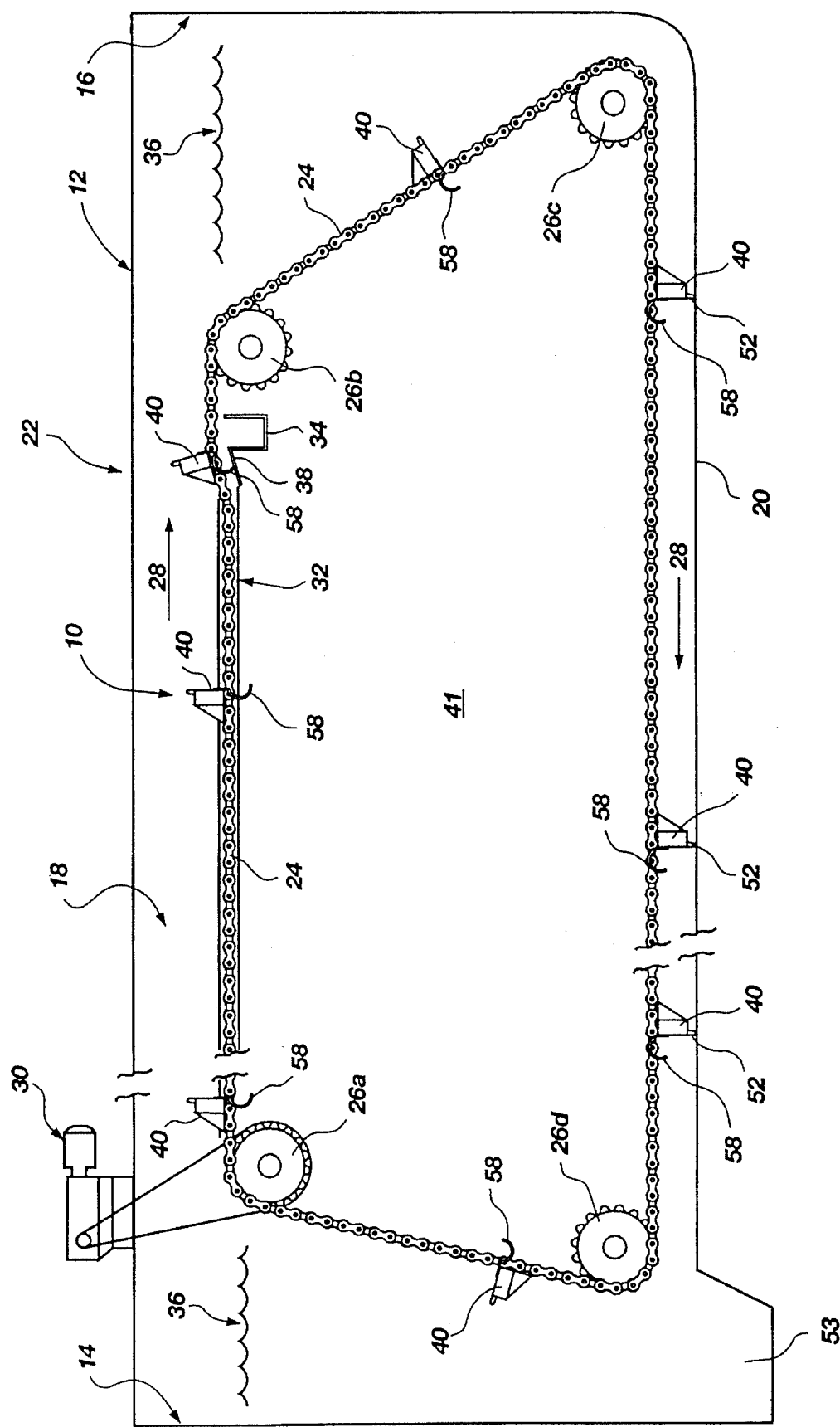
FIG. 1 is a view in cross section of a rectangular clarifier tank in which is installed a chain and flight mechanism of the present invention.

FIG. 1 illustrates a simplified installation of one embodiment of the present invention where a chain and flight mechanism, generally at 10, is installed in a rectangular clarifier tank 12. The rectangular clarifier tank 12 comprises two opposing short side walls 14, 16 and two opposing longitudinal side walls 18. The tank 12 also comprises a bottom 20 and an open top 22. The chain and flight mechanism 10 of the clarifier tank 12 further comprises two continuous chains 24, one chain positioned against each of the two opposing longitudinal side walls 18 of the tank 12. Only one longitudinal side wall 18 and associated chain 24 are illustrated in the cross section of FIG. 1. However, a mirror image installation of the chain and flight 10, as described further hereinafter, is understood to exist on the opposing longitudinal wall.

Four or more sprocket wheels 26a–d are secured to the interior surface of the longitudinal side wall 18, and the chain 24 is positioned to rotate about all of the sprocket wheels in the direction of arrows 28. A chain drive motor 30 is positioned near the tank 12 and interconnected to the sprocket wheels 26 to cause rotation of the chain 24. A wall rail track 32 is installed along the interior surface of the longitudinal wall 18 to guide the chain 24 about its rotation.

A scum trough 34 spans the width of the clarifier tank 12 between opposing longitudinal walls and may be secured to the opposing longitudinal walls 18. The scum trough 34 is positioned in the upper portion of the tank 12 at about the level of fluid 36 in the tank 12. The scum trough 34 may have a beach 38 associated therewith to assist in moving the collected debris or scum to the scum trough 34 for deposit therein. When a beach 38 is employed with the scum trough 34, the beach 38 aids in preventing scum from dropping back into the tank 12.

As can be seen in FIG. 1, a number of flights 40 are connected to the chain 24 and are spaced apart from each other a select distance. Notably, a single flight 40 may be associated with the chain 24, or a plurality of flights 40 may be associated with the chain 24 as illustrated here. The number of flights 40 interconnected between the chains 24 is dependent upon the size of the tank 12, the chain 24 length and the amount of debris to be removed from the fluid. Each flight 40 comprises an elongated, substantially planar member which is interconnected between the two chains and is affixed to the two chains in proximity to the two opposing longitudinal side walls 18. The flights 40 are attached to the chains 24 so that each flight 40 is oriented in a direction away from the center 41 of the tank 12 (i.e., connected to the outer raceway of the chain 24).

Figure 2:
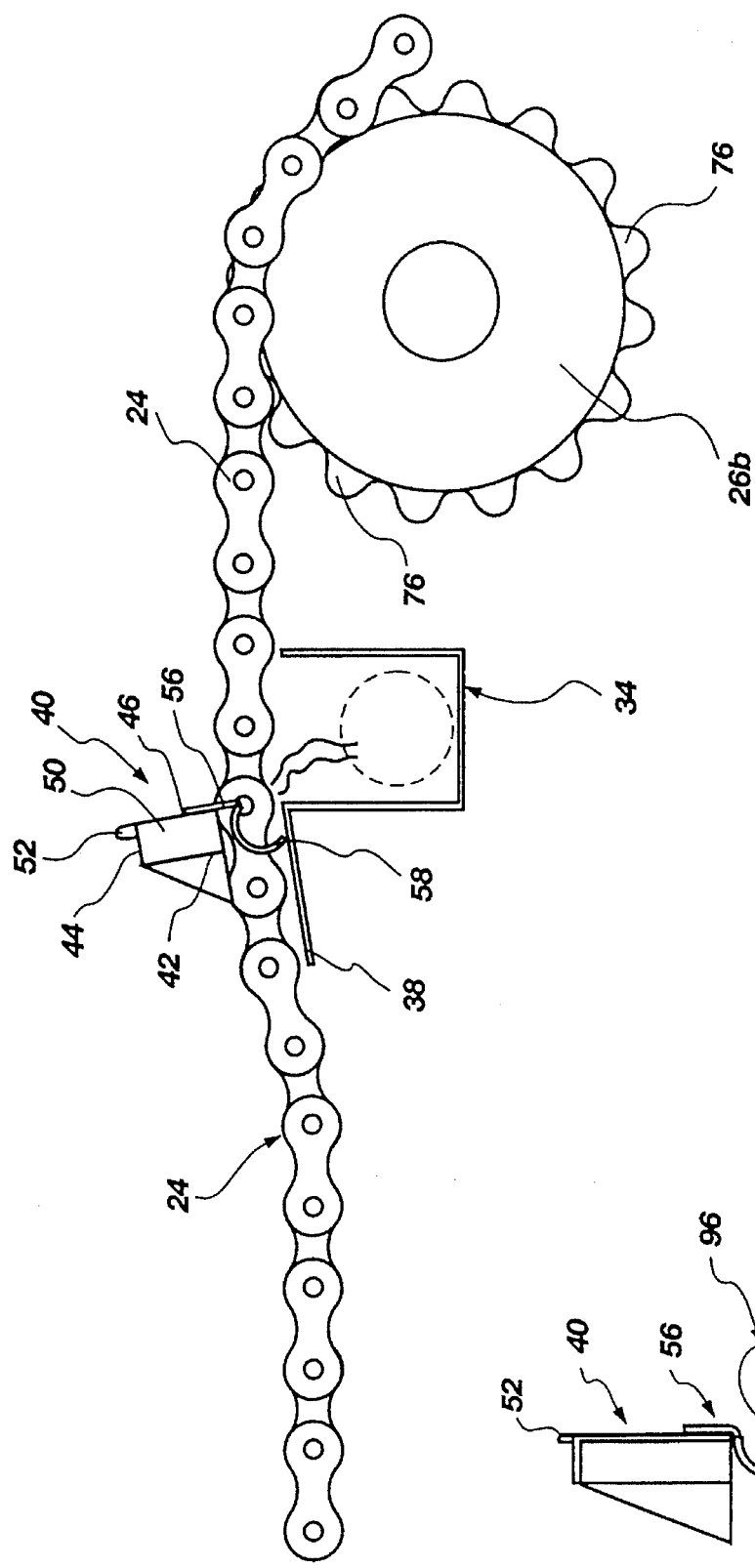
FIG. 2 is an enlarged side view of the chain and flight mechanism illustrated in FIG. 1.
Figure 3:
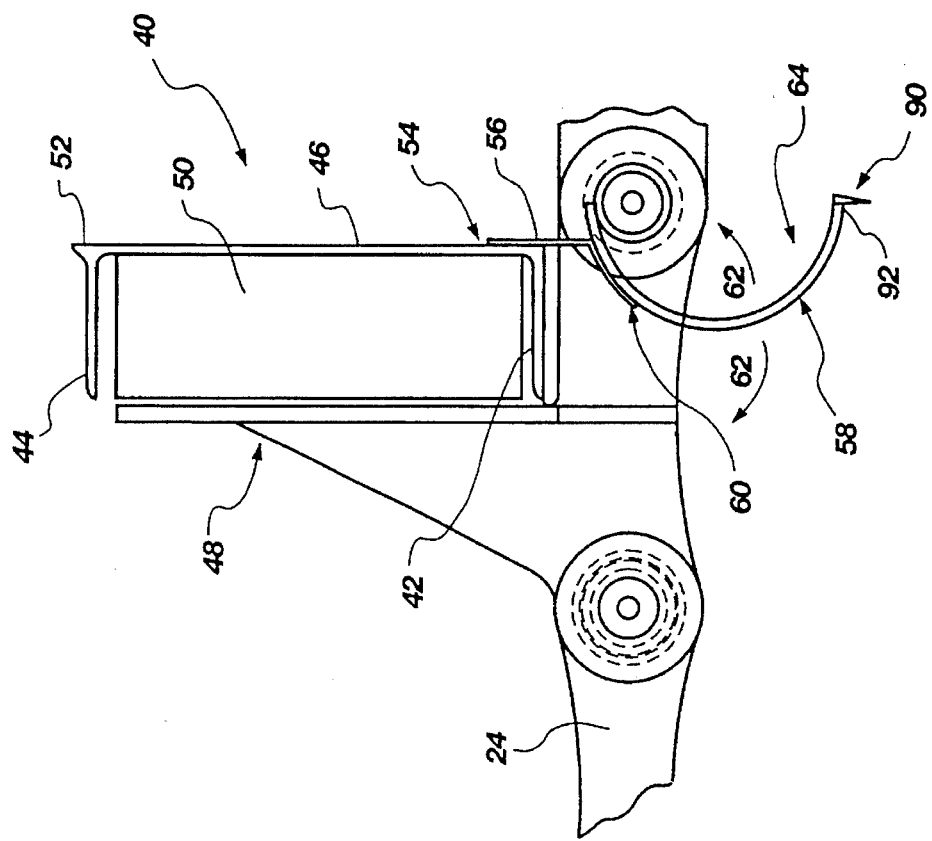
FIG. 3 is an enlarged side view of the skimmer means of the invention.

As more clearly illustrated in FIGS. 2 and 3, each flight 40 comprises a bottom end 42 connected at either end of the flight 40 to the chain 24 and oriented toward the center 41 of the tank 12. Each flight 40 also comprises a top end 44 oriented away from the chain 24 and a forward face 46 oriented in the direction of rotation of the chain 24. The flight 40 may be constructed with a set of flight support brackets 48 connected to the chains 24, as shown, and may have an elongated block 50, such as of wood or plastic, secured within the two brackets 48 and spanning therebetween.

At the top end 44 of each flight 40 is positioned a flight scraper 52 which is oriented toward the bottom 20 of the tank 12 when the flights 40 are rotated to the bottom of the tank 12. The flight 40 scraper 52 of each flight skims the bottom 20 of the tank 12 and moves scum which has sunk to the bottom 20 of the tank 12 toward the scum drain 53 located in the tank 12 (FIG. 1). At the lower end 54 of the forward face 46 of the flight 40, a hinge means 56 is connected to the flight 40. The hinge means 56 may be constructed of a strip of flexible material which spans the length of the flight 40 (i.e., between the longitudinal side walls 18). The hinge means 56 may be secured to the lower end 54 of the flight 40 by any suitable means, including screws, nails, rivets or waterproof adhesive. Alternatively, the hinge means 56 may be integrally formed as a unitary part of the structure of the flight 40.

A skimmer means 58 is attached to the hinge means 56 in a manner such that the skimmer means 58 is able to move and assume a plurality of positions at various angles in a plane normal to the longitudinal axis of the flight 40. As illustrated, the skimmer means 58 may be connected to the hinge means 56 by attachment to a strip 60 of the hinge means 56, which is formed at an angle to the rest of the hinge means 56. The skimmer means 58 may be attached to the strip 60 of the hinge means 56 by any securement means, including screws, bolts, rivets or waterproof adhesive. By virtue of the illustrated attachment, the skimmer means 58 is able to swing back and forth in the direction of arrows 62.

Figure 5:
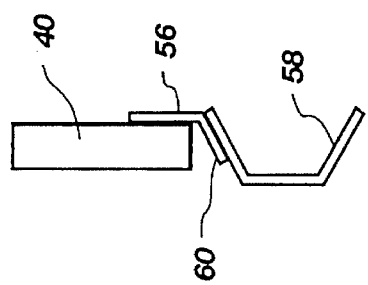
FIG. 5 is a view in cross section of another alternative configuration of the skimmer means.
Figure 4:
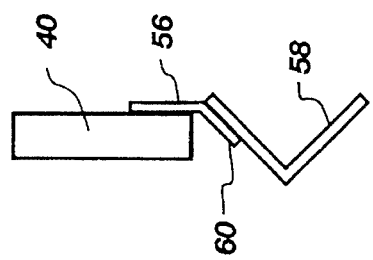
FIG. 4 is a view in cross section of an alternative configuration of the skimmer means.
Figure 6:
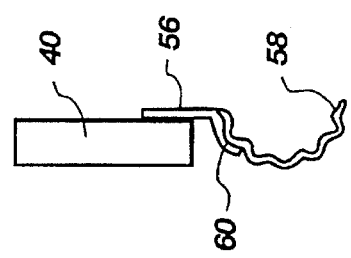
FIG. 6 is a view in cross section of another configuration of the skimmer means.

The skimmer means 58 comprises an elongated, three-dimensional member which extends the length of the flight 40 (i.e., between the longitudinal side walls 18). The three-dimensional configuration of the skimmer means 58 provides an interior space 64 (FIG. 3) which collects and holds floating debris as the skimmer means 58 moves across the water's surface 36. The skimmer means 58 may be substantially semi-circular in cross section, as illustrated by the "C-section" in FIGS. 2 and 3. Alternatively, the skimmer means 58 may comprise any suitable configuration in cross section which provides an interior surface 64 capable of capturing and collecting floating debris. As illustrated in FIGS. 4–6, alternative cross sectional configurations of the skimmer means 58 may include a two-sided structure (FIG. 4), a multiple-sided structure (FIG. 5) or a corrugated structure (FIG. 6). In all such cross sectional configurations, the skimmer means 58 is connected to the hinge means 56 by means, such as strip 60, which allows the skimmer means 58 to move back and forth as it travels through the water and up the scum trough 34.

Figure 7:
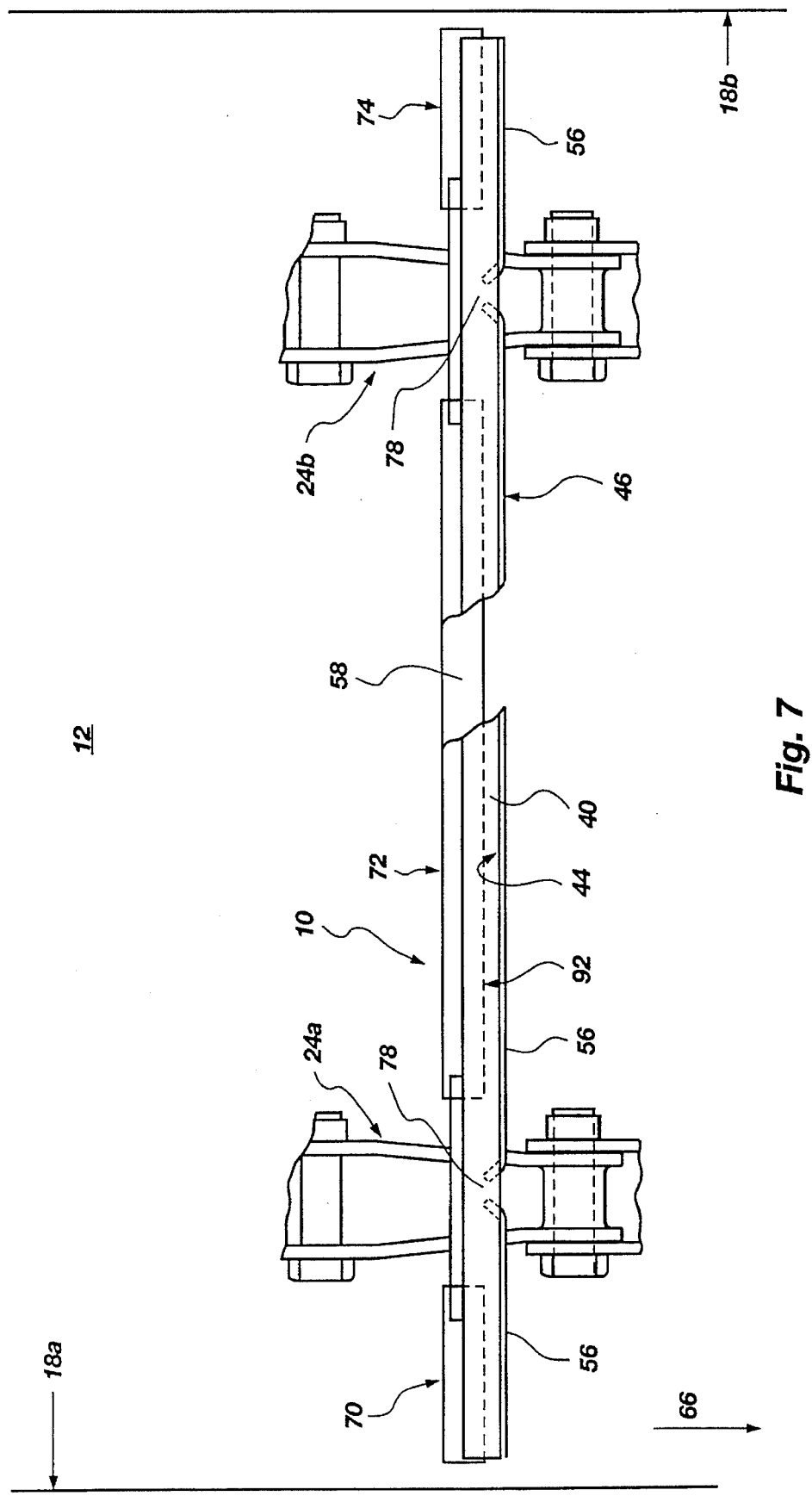
FIG. 7 is a plan view of the flight and chain with skimmer means, shown in partial, breakaway.

Placement of the chain and flight mechanism 10 relative to the tank 12 can be seen further in FIG. 7 where the two chains 24a and 24b are shown positioned near the longitudinal side wails 18a and 18b of the tank 12. Only a section of the chains 24a and 24b is shown, and positioning of the chains 24a and 24b in the wall rail track 32 is not illustrated. The flight 40 is shown positioned above the chains 24a and 24b and interconnected therebetween. The flight 40 spans from proximate one longitudinal side wall 18a to proximate the opposing longitudinal side wall 18b. The forward face 46 of the flight 40 is oriented in the direction of rotation, arrow 66, of the chains 24 within the tank 12.

The skimmer means 58 is shown positioned below the flight 40 and extending slightly behind the flight 40. The hinge means 56 is shown extending from the forward face 46 of the flight 40, and although not seen from this view, the skimmer means 58 extends downwardly from the hinge means 56. In this particular embodiment where the flight 40 is attached to the outer raceway of the chains 24 and oriented away from the center 41 of the tank 12, the skimmer means 58 is comprised of three separate sections 70, 72, 74 so that the skimmer means 58 may travel on either side of the chains 24. The central section 72 of the skimmer means 58 extends between the chains 24a and 24b. The side section 70 of the skimmer means 58 extends from chain 24a to proximate the longitudinal side wall 18a. The other side section 74 of the skimmer means 58 extends from chain 24b to proximate the longitudinal side wall 18b.

FIG. 8 illustrates an enlarged partial section of the chain and flight mechanism 10 as seen looking toward the forward face 46 of the flight 40 as the chain 24a, flight 40 and skimmer means 58 travel over a sprocket 76 of the sprocket wheel 26. It can be seen that the skimmer means 58, here comprising sections 70 and 72, is configured and attached to the hinge means 56 in a manner which allows the skimmer means 58 to travel unobstructed along either side of the chain 24a. The hinge means 56, formed of a flexible material, may be structured with a slit 78 or other compliant means which allows the hinge means 56 to travel over the sprocket 76 in an unobstructed manner. Although only one slit 78 in the hinge means 56 is illustrated in FIG. 8, two slits 78 are formed in the hinge means 56, as shown in FIG. 7, at a centralized location over each chain 24 where the hinge means 56 will encounter sprockets 76 of the sprocket wheel 26. In FIG. 7, the splits 78 in the hinge means 56, shown in phantom, open beneath the flight 40.

The skimmer means 58 has end caps 80 secured to each end 82, 84, 86 of each segment 70, 72, 74 thereof, as illustrated in FIGS. 8 and 9. The securement of end caps 80 on the open ends of each segment 70, 72, 74 of the skimmer means 58 keeps the floating debris which is collected by the skimmer means 58 retained within the interior space 64 of the skimmer means 58. The embodiment shown in FIG. 8 also illustrates the attachment of a scraper lip 90 (also illustrated in FIG. 3) to the bottom edge 92 of the skimmer means 58. The scraper lip 90 assists in scraping debris or scum up the beach 38 associated with the scum trough 34 so that all debris is collected. The scraper lip 90 extends along the length of the skimmer means 58 and may typically be made of a pliant or resilient material which allows the scraper lip 90 to comply to the beach 38 during movement up the beach 38 toward the scum trough 34. The scraper lip 90 may or may not be used with the skimmer means 58.

Figure 10:
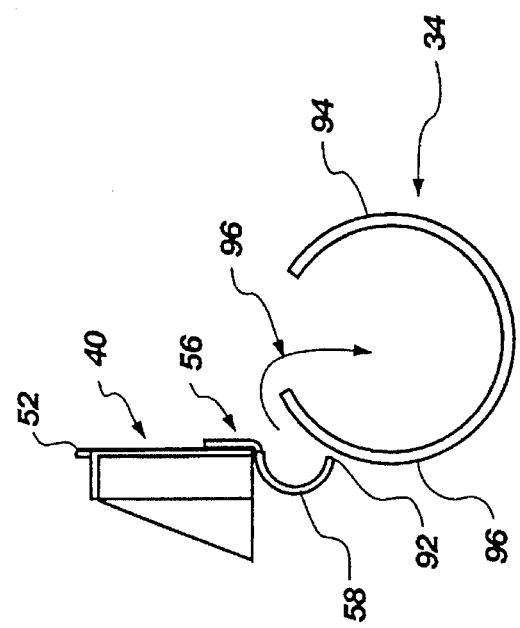
FIG. 10 is a side view of a round scum trough.

The skimmer means 58 is attached to the flight 40 and positioned at about the water level 36 in the tank 12. Thus, as the chain and flight mechanism 10 rotates about the tank 12, the skimmer means 58 will travel along the upper portion of the tank 12 along the water level 36, collecting floating debris or scum as it moves. As the skimmer means 58 approaches the scum trough 34, the skimmer means 58 generally moves the collected debris to the open top of the scum trough 34 for deposit therein. As illustrated in FIG. 10, the skimmer means 58 may be used in conjunction with a round scum trough 34, or open-top pipe, where the lower edge 92, or scraper lip (not shown), makes contact with the outer surface 96 of the scum trough 34 to maintain collected debris 98 within the interior space 64 of the skimmer means 58 until the debris 98 finally spills into the scum trough 34. Other cross-sectional configurations of the scum trough 34 are suitable, such as the rectangular scum trough 34 illustrated in FIGS. 1 and 2.

Figure 11:
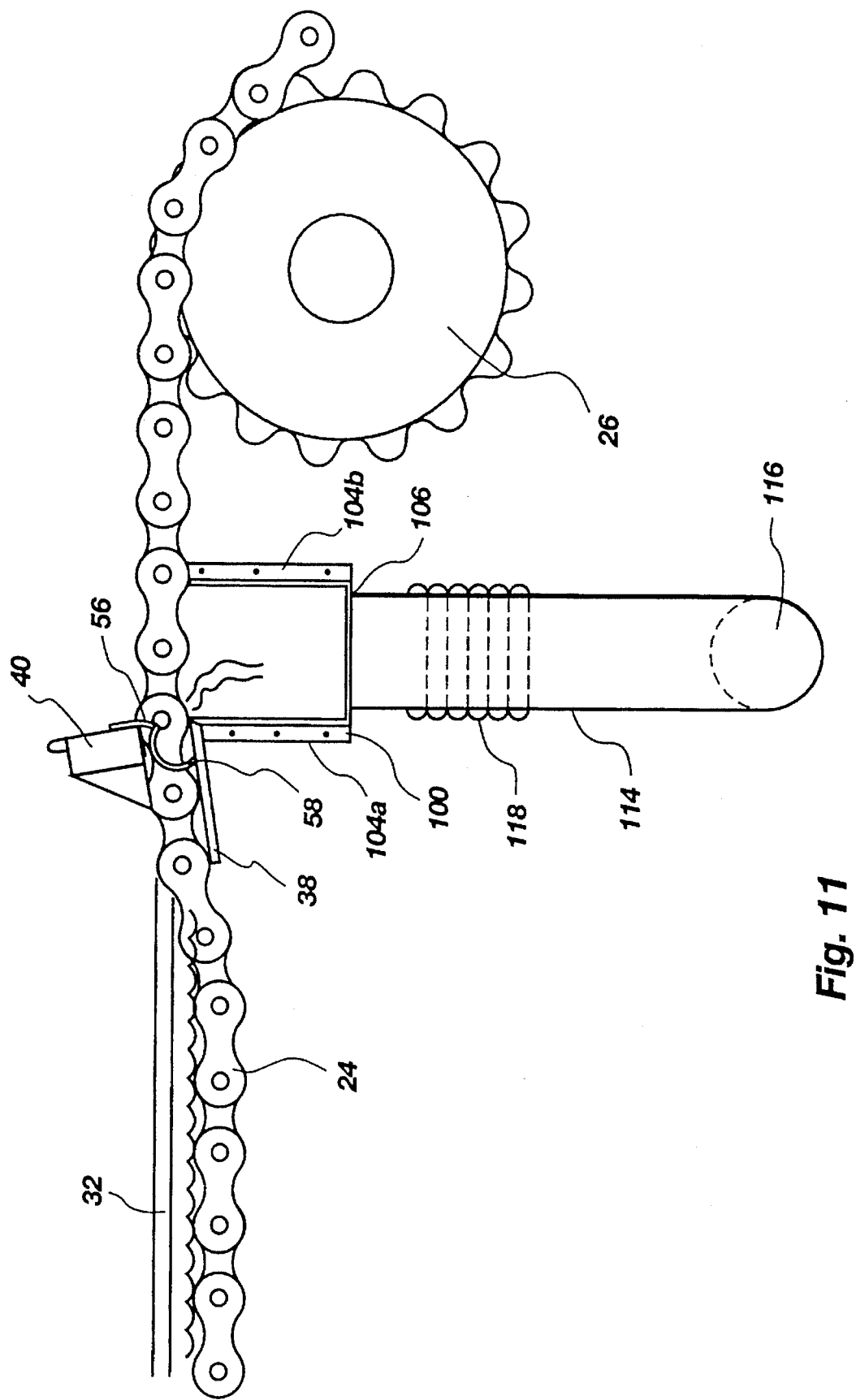
FIG. 11 is a side view of a self-adjusting scum trough.
Figure 12:
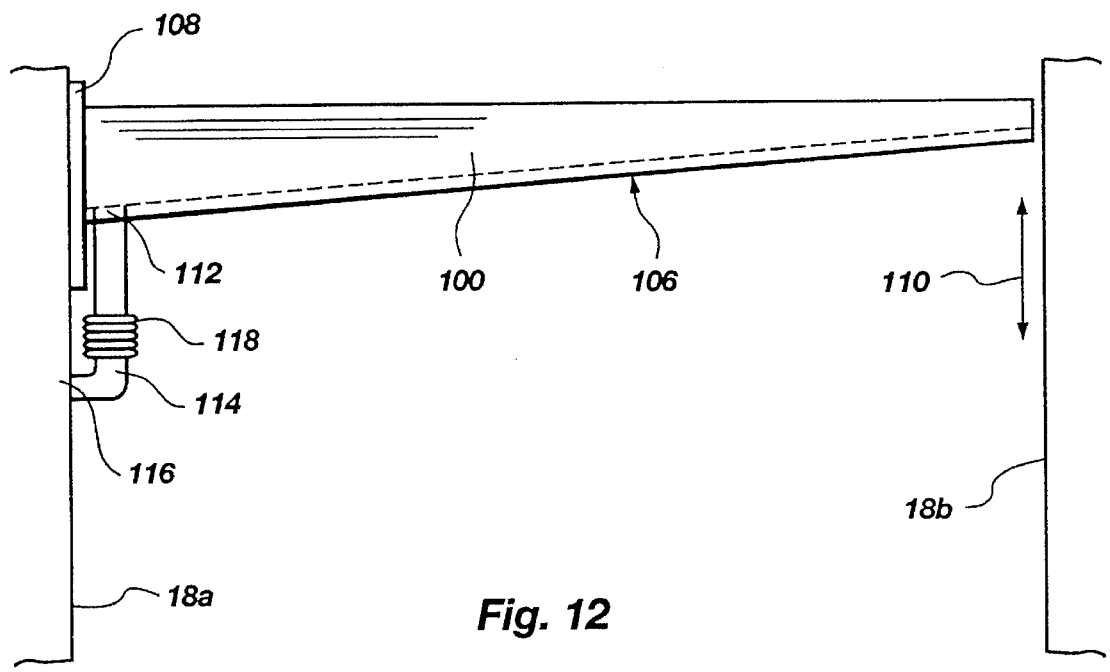
FIG. 12 is a front view in elevation of the self-adjusting scum trough illustrated in FIG. 11.
Figure 13:
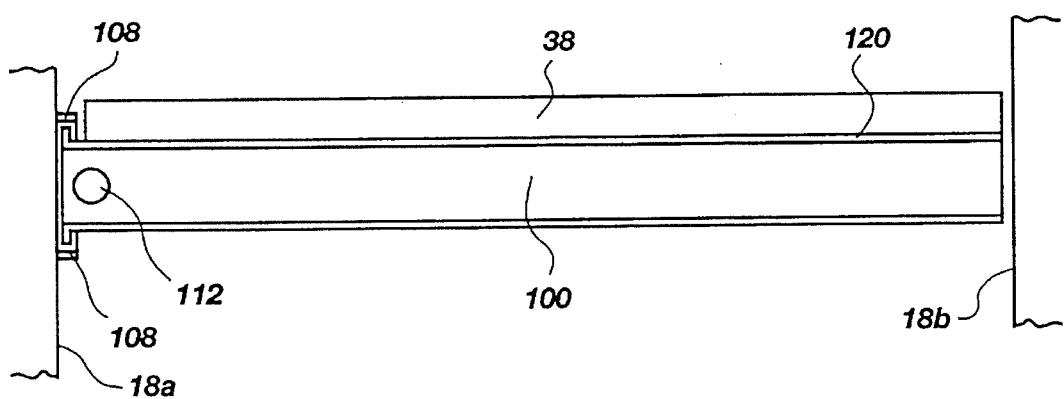
FIG. 13 is a plan view of the self-adjusting scum trough illustrated in FIG. 11.

An alternative scum trough which is suitable for use with the chain and flight mechanism 10 disclosed hereinabove is illustrated in FIGS. 11–13. The self-adjusting scum trough 100 comprises an elongated receptacle 102 having two opposing elongated side walls 104a and 104b and a bottom 106. The trough 100 is connected to at least one of the longitudinal side walls, here shown as 18a, of the tank 12 by bracket means 108, which allow the scum trough 100 to slide up and down relative to the tank 12, in the direction of arrow 110, and within the bracket means 108. Thus, the scum trough 100 is free to be buoyed up by the water in the tank 12.

An outlet 112 is formed in the bottom 106 of the scum trough 100 through which the debris and scum deposited in the scum trough 100 exits into outlet pipe 114 and through a tank outlet 116. It can be seen in FIG. 12 that the bottom 106 of the scum trough 100 may be inclined or constructed at an angle to encourage or facilitate movement of the debris or scum toward the outlet 112.

The outlet pipe 114 of the self-adjusting scum trough 100 has an expandable portion 118 associated therewith which will expand and contract as the scum trough 100 moves up or down in the direction of arrow 110 responsive to the water level in the tank 12. The expandable portion 118 of the outlet pipe 114 therefore lengthens or shortens according to the relative position of the scum trough 100 in the tank 12. As seen in FIG. 13, the scum trough 100 may have a beach 38 associated therewith and connected to an upper edge 120 of the open top of the scum trough 100.

The chain and flight mechanism 10, as best illustrated in FIG. 11, has a degree of slack. In addition, the skimmer means 58 extending downwardly from the flight 40 may add an additional six to ten inches of extending profile below the flight 40. The combination of slack in the chain and the downwardly extending profile of the skimmer means 58 enables the skimming mechanism (i.e., the chain and fright mechanism 10 plus skimmer means 58) to efficiently skim the water's surface even though the level in the tank 12 may vary. Further, the downwardly extending skimmer means 58 may adjust to varying heights of the scum trough 100, and the beach 38 (if used), by virtue of its attachment to the hinge means 56, which allows the skimmer means 58 to adjust rotationally relative to the flight 40.

The embodiment of the invention illustrated in FIGS. 1–13 may, most typically, be initially installed in a rectangular clarifier tank or may be retrofitted to existing tanks which have pre-existing structure for the chain and flight mechanism. However, the present invention may also be adapted for use in pre-existing tanks which, for example, have length and width dimensions or other configuration restraints which do not permit the installation of an "in-tank" chain and flight mechanism as previously described.

Figure 14:
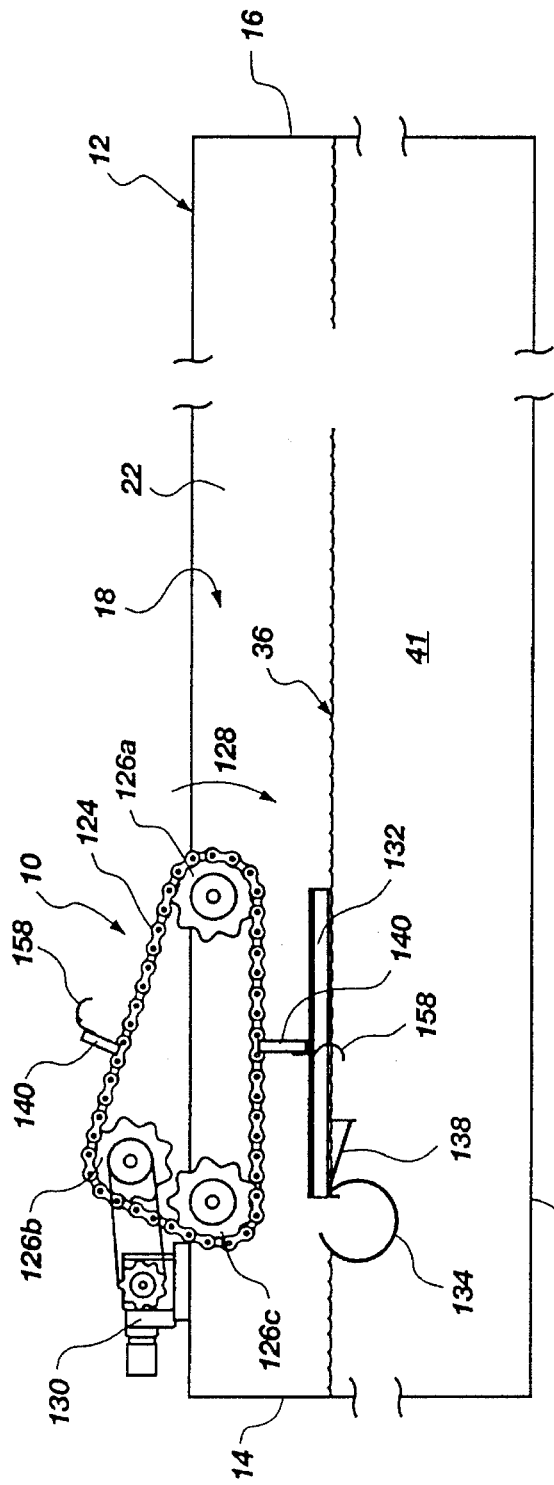
FIG. 14 is a side view in elevation of an alternative embodiment of the chain and flight mechanism of the present invention which is positioned above the water level in a clarifier tank.
Figure 15:
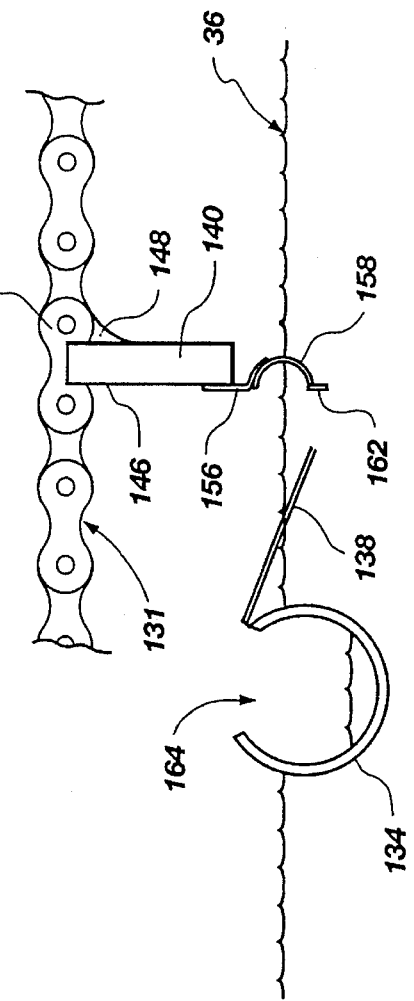
FIG. 15 is an enlarged view of the chain and flight mechanism illustrated in FIG. 14.

Therefore, as illustrated in FIGS. 14 and 15, an alternative embodiment of the invention may be configured for installation as an "above-tank" structure. That is, the chain and flight mechanism 10 is positioned in the upper region of the rectangular tank 12 and above the water level 36 in the tank 12. A plurality of sprocket wheels 126a, 126b, 126c are attached to the longitudinal side walls 18 of the tank 12, or to brackets (not shown) which are attached to or near the longitudinal side walls 18 of the tank 12. As noted previously, although only one of the longitudinal side walls 18 is illustrated in the cross sectional view of FIG. 14, it is understood that a mirror image configuration of the chain and flight mechanism 10, including sprocket wheels 126a–c, is attached to the opposing longitudinal side wall 18.

The chain 124 is positioned about the plurality of sprocket wheels 126a–c. A chain drive motor 130 is interconnected with the sprocket wheels 126a–c to cause the sprocket wheels 126a–c to turn in the direction of arrow 128. Flights 140 are interconnected between the chains 124. In the present embodiment, the flights 140 are connected to the chains 124 along the outer raceway 131 of the chain 124 and are oriented toward the center 41 of the tank 12. The flights 140 may be interconnected with flight guide tracks 132 attached to the interior surface of the longitudinal side walls 18 to guide movement of the flights 140 along the water's surface 36.

Hinge means 156 is connected to the forward face 146 of flight 140, and skimmer means 158 is connected to the hinge means 156 such that the skimmer means 158 is oriented toward the center 41 of the tank 12. The skimmer means 158 is attached to the hinge means 156 in a manner which allows the skimmer means 158 to adjust to various angles in a plane normal to the longitudinal axis of the flight 140. A scraper lip 162 may be connected to the skimmer means 158 as previously described.

As the chain 124 rotates about the sprocket wheels 126a–c in the direction of arrow 128, the flight 140 extends downwardly from the chain 124 toward the center 41 of the tank, and the skimmer means 158 is positioned relative to the water level 36 so that floating debris and scum is collected by the skimmer means 158. As the chain 124 rotates, the skimmer means 158 approaches the beach 138 (if used) connected to the scum trough 134. The skimmer means 158 contacts the beach 138 and moves the collected debris upwardly along the beach 138 until it falls into the open top 164 of the scum trough 134. The debris then exits through an outlet port (not shown in FIGS. 14 and 15) and away from the tank 12.

The flight 140 of the embodiment illustrated in FIGS. 14 and 15 is an elongated structure which spans the width of the tank 12 from one longitudinal side wall 18 to the other. The hinge means 156 is an elongated member formed of pliant or resilient material which permits movement of the hinge means 156 and the skimmer means 158. Unlike the previously described embodiment, no slits are necessary in the hinge means 156 since, in this embodiment, the hinge means 156 is directed away from the sprocket wheels 126a–c and does not need to travel over the sprockets. Likewise, the skimmer means 158 of the illustrated embodiment of FIGS. 14 and 15 may be a unitary elongated member which extends from one longitudinal side wall 18 to the other. The skimmer means 158 of this embodiment is oriented away from the chain 124 and does not require a configuration to accommodate movement on either side of the chain 124.

The embodiment shown in FIGS. 14 and 15 illustrates one manner of placing an "above-tank" chain and flight mechanism 10 with skimmer means 158 in an existing tank where the chain and flight mechanism 10 is positioned only at one end of the tank 12. Alternatively, it may be appropriate to position the chain and flight mechanism 10 with skimmer means 158 in the tank 12 to be more coextensive with the length of the tank 12. Such an embodiment would be appropriate where more flights are required and/or where the length or other dimensions of the tank 12 require a longer chain and flight mechanism configuration.

Figure 16:
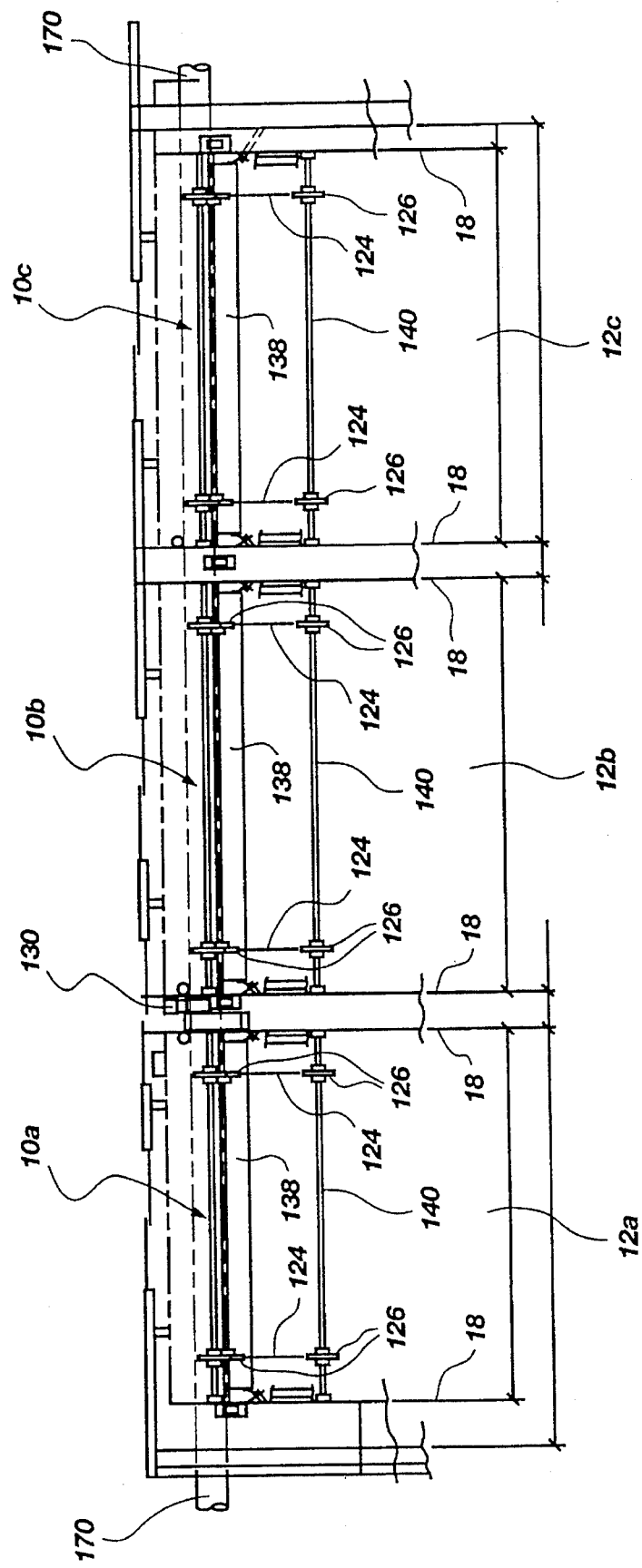
FIG. 16 is a plan view of manifold chain and flight mechanisms in adjacent clarifier tanks.

The chain and flight mechanism of the present invention may be adapted for a manifold configuration in adjacent rectangular tanks, as illustrated in FIG. 16. As shown, three adjacent tanks 12a–c have been retrofitted with "above-tank" chain and flight mechanisms 10a–c which may be interconnected for operation by a single chain drive motor 130. The sprocket wheels 126 associated with each of the longitudinal side walls 18 of each tank 12*a–c* are seen interconnected with the chains 124 associated therewith. A representative flight 140 is shown interconnected between sets of chains 124 in each tank 12*a–c*. A view of the scum trough associated with each tank 12*a–c* is obstructed in FIG. 16 by the chain and flight mechanism 10*a–c*, but the beach 138 associated with each scum trough is seen. A common outlet pipe 170 is positioned through all of the adjacent tanks 12*a–c* to carry collected debris away from the tanks 12*a–c*.

The present chain and flight mechanism with hinged skimmer means may be used in any clarifier tank, thickener tank or other fluid processing tank, and is not limited in its dimensions or configuration to rectangular tanks, as described herein. Thus, reference herein to specific details of the illustrated embodiments is by way of example and not by way of limitation. It will be apparent to those skilled in the art that many modifications of the basic illustrated embodiment may be made without departing from the spirit and scope of the invention as recited by the claims.

What is claimed is:

1. A fluid treatment tank comprising:
   a tank for receiving fluid;
   a skimmer mechanism comprising:
      a set of chains associated with said tank and aligned with each other in spaced-apart orientation, said set of chains being positioned to rotate in a common direction;
      at least one flight comprising an elongated structure extending between said set of chains;
      a flexible hinge member connected to said flight;
      a skimmer attached to said hinge member and extending away from said flight, said skimmer being an elongated member, having a three-dimensional configuration and having an interior space;
   a driving mechanism engaging said set of chains; and
   a scum trough positioned in said tank proximate said skimmer mechanism.

2. The fluid treatment tank of claim 1 wherein said tank further comprises two opposing and spaced apart longitudinal side walls, two spaced apart end walls, a bottom and an open top, and wherein said set of chains are positioned within said tank and comprise a continuous chain positioned against each of said longitudinal side walls such that said at least one flight connected between said set of chains rotatingly travels along said bottom of said tank and proximate said open top of said tank.

3. The fluid treatment tank of claim 1 wherein said at least one flight has a first end and a second end and said second end of said at least one flight is secured to said set of chains, and wherein said hinge member is connected to said second end of said at least one flight.

4. The fluid treatment tank of claim 3 wherein said skimmer comprises a plurality of segments positioned between said set of chains and between each chain of said set of chains and said longitudinal side wall, each said plurality of segments having a first end and a second end oriented toward said longitudinal side walls and having an end cap positioned over each said first and second end.

5. The fluid treatment tank of claim 14 wherein said hinge is formed with a slit positioned over each said chain.

6. The fluid treatment tank of claim 4 wherein said scum trough extends between said longitudinal side walls and is secured to at least one of said longitudinal side walls.

7. The fluid treatment tank of claim 6 further comprising a beach attached to said scum trough and positioned to interface with said skimmer of said skimmer mechanism.

8. The fluid treatment tank of claim 4 wherein said scum trough is positioned against at least one of said longitudinal side walls and is slidably movable relative to said longitudinal side walls, and wherein said scum trough further comprises an expandable outlet pipe secured between said scum trough and said tank.

9. The fluid treatment tank of claim 3 wherein said at least one flight further includes a scraper lip attached to said first end thereof.

10. The fluid treatment tank of claim 1 wherein said tank further comprises two opposing and spaced apart longitudinal side walls, two spaced apart end walls, a bottom and an open top, and wherein said set of chains are positioned in part above said tank and comprise a continuous chain positioned proximate each of said longitudinal side walls.

11. The fluid treatment tank of claim 10 wherein said at least one flight has a first end and a second end, said first end of said flight being secured to said set of chains and said hinge member being secured to said second end of said at least one flight.

12. The fluid treatment tank of claim 11 wherein said skimmer has attached thereto a scraper lip oriented away from said chain.

13. The fluid treatment tank of claim 11 wherein said scum trough is secured to at least one of said longitudinal side walls of said tank.

14. The fluid treatment tank of claim 13 further comprising a beach attached to said scum trough and positioned to interface with said skimmer of said skimmer mechanism.

15. The fluid treatment tank of claim 11 wherein said scum trough is positioned against at least one of said longitudinal side walls and is slidably movable relative to said longitudinal side walls, and wherein said scum trough further comprises an expandable outlet pipe secured between said scum trough and said tank.

* * * * *